(12) United States Patent
Yamaguchi

(10) Patent No.: US 11,563,316 B2
(45) Date of Patent: Jan. 24, 2023

(54) SYSTEM INCLUDING MANAGEMENT APPARATUS AND ELECTRONIC DEVICE CONNECTED TO CORD REEL

(71) Applicant: Panasonic Intellectual Property Management Co., Ltd., Osaka (JP)

(72) Inventor: Akira Yamaguchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 424 days.

(21) Appl. No.: 16/793,431

(22) Filed: Feb. 18, 2020

(65) Prior Publication Data

US 2021/0257822 A1  Aug. 19, 2021

(51) Int. Cl.
*H02G 11/02* (2006.01)
*G06F 3/041* (2006.01)
*H04R 3/00* (2006.01)

(52) U.S. Cl.
CPC ........... *H02G 11/02* (2013.01); *G06F 3/0412* (2013.01); *H04R 3/007* (2013.01)

(58) Field of Classification Search
CPC ...................................................... H02G 11/02
See application file for complete search history.

(56) References Cited

U.S. PATENT DOCUMENTS

| | | | | |
|---|---|---|---|---|
| 3,889,071 A | * | 6/1975 | Davis ................. | H04M 1/0297 379/454 |
| 4,868,862 A | * | 9/1989 | Ryoichi ................ | B60K 20/02 379/438 |
| 5,652,792 A | | 7/1997 | Gallagher et al. | |
| 6,293,485 B1 | * | 9/2001 | Hollowed ........... | B65H 75/4434 242/385.3 |
| 10,170,902 B2 | * | 1/2019 | Jiang .................... | H01R 13/72 |
| 11,061,446 B1 | * | 7/2021 | Ueno .................... | G06F 3/0488 |
| 2007/0007379 A1 | * | 1/2007 | Leyden ................ | B65H 75/486 242/371 |
| 2007/0199028 A1 | * | 8/2007 | Yau ...................... | B60K 37/06 725/77 |

(Continued)

FOREIGN PATENT DOCUMENTS

| | | |
|---|---|---|
| JP | 2005-236097 | 9/2005 |
| JP | 2012-182246 | 9/2012 |

(Continued)

*Primary Examiner* — Olisa Anwah
(74) *Attorney, Agent, or Firm* — Wenderoth, Lind & Ponack, LLP

(57) ABSTRACT

The system includes an electronic device connected to a cord that can be unreeled and reeled in by a cord reel, and a management apparatus that can communicate with the electronic device. In the system, the cord-reel-use detector is disposed in the electronic device, and detects use of the cord reel. The memory is disposed in the electronic device and/or the management apparatus, and stores an amount of use of the cord reel. The controller is disposed in the electronic device and/or the management apparatus, and determines the use of the cord reel on the basis of the detection made by the cord-reel-use detector. The controller changes the amount of use of the cord reel in response to the electronic device having been replaced with another electronic device or in response to the cord reel having been replaced with another cord reel.

14 Claims, 14 Drawing Sheets

(56) References Cited

U.S. PATENT DOCUMENTS

| | | | |
|---|---|---|---|
| 2015/0108265 A1* | 4/2015 | Okamoto | B65H 75/446 |
| | | | 242/398 |
| 2016/0264244 A1* | 9/2016 | Matsumoto | B64D 11/0015 |
| 2017/0283086 A1* | 10/2017 | Garing | B64D 45/0051 |
| 2019/0023523 A1* | 1/2019 | Masaki | H02G 11/02 |
| 2019/0086976 A1* | 3/2019 | Alford | G06F 1/26 |
| 2019/0267788 A1* | 8/2019 | Masaki | B65H 75/4434 |

FOREIGN PATENT DOCUMENTS

| | | |
|---|---|---|
| JP | 2016-38683 | 3/2016 |
| JP | 2018-45945 | 3/2018 |
| JP | 2019-8142 | 1/2019 |

\* cited by examiner

| HANDSET ID | CORD REEL ID | CUMULATIVE NUMBER OF USES |
|---|---|---|
| H00025 | CR110055 | 000186 |

FIG. 7A

| SEAT ID | HANDSET ID | CUMULATIVE NUMBER OF USES |
|---|---|---|
| ST001 | H00010 | 000059 |
| ST002 | H00025 | 000186 |
| ST003 | H00003 | 001075 |
| ST004 | H00107 | 000365 |
| ⋮ | ⋮ | ⋮ |

FIG. 7B

| HANDSET ID | CORD REEL ID | CUMULATIVE NUMBER OF USES |
|---|---|---|
| H00025 | CR120050 | 000000 |

FIG. 10A

| SEAT ID | HANDSET ID | CUMULATIVE NUMBER OF USES |
|---|---|---|
| ST001 | H00010 | 000059 |
| ST002 | H00025 | 000000 |
| ST003 | H00003 | 001075 |
| ST004 | H00107 | 000365 |
| ⋮ | ⋮ | ⋮ |

FIG. 10B

| HANDSET ID | CORD REEL ID | CUMULATIVE NUMBER OF USES |
|---|---|---|
| H01189 | CR104608 | 000000 |

FIG. 11A

| SEAT ID | HANDSET ID | CUMULATIVE NUMBER OF USES |
|---|---|---|
| ST001 | H00010 | 000059 |
| ST002 | H00025 | 000186 |
| ST003 | H00003 | 001075 |
| ST004 | H01189 | 000365 |
| ⋮ | ⋮ | ⋮ |

FIG. 11B

SYSTEM INCLUDING MANAGEMENT APPARATUS AND ELECTRONIC DEVICE CONNECTED TO CORD REEL

BACKGROUND

Technical Field

The present disclosure relates to a system including a management apparatus and an electronic device connected to a cord that can be unreeled and reeled in by a cord reel.

Background Art

For example, U.S. Pat. No. 5,652,792 discloses a handset and a cradle capable of accommodating the handset. The handset is connected to a cord wound around a cord reel such that the cord can be unreeled and reeled in, and through the cord, power is supplied and communication with another electronic device is performed.

BRIEF SUMMARY

With a cord unreeled and reeled in by a cord reel, there are cases in which degradation over time occurs readily and the connection function is impaired. Additionally, the cord reel is likely to suffer physical damage due to including its complicated mechanism. When numerous electronic devices are used simultaneously in a facility and/or an aircraft or another passenger moving object, maintenance of the cord wound on the cord reel becomes difficult.

The present disclosure provides a system that is effective in simplifying maintenance of a cord reel which is connected to an electronic device and by which a cord can be unreeled and reeled in.

The system of the present disclosure includes an electronic device connected to a cord that can be unreeled and reeled in by a cord reel, and a management apparatus configured to communicate with the electronic device. The system also comprises a cord-reel-use detector, at least one memory, and at least one controller. The cord-reel-use detector disposed in the electronic device, and the cord-reel-use detector is configured to detect use of the cord reel. The memory is disposed in at least one of the electronic device and the management apparatus, and the memory is configured to store an amount of the use of the cord reel. The controller is disposed in at least one of the electronic device and the management apparatus, the controller is configured to determine the use of the cord reel on a basis of detection made by the cord-reel-use detector. The controller is configured to change the amount of the use of the cord reel in response to the electronic device being replaced with another electronic device or in response to the cord reel being replaced with another cord reel.

BRIEF DESCRIPTION OF DRAWINGS

FIG. 7A shows an example of cord-reel-use information retained in the handset;

FIG. 7B shows an example of cord-reel-use information retained in the management apparatus;

FIG. 10A shows an example of cord-reel-use information retained in the handset when the cord reel is replaced;

FIG. 10B shows an example of cord-reel-use information retained in the management apparatus when the cord reel is replaced;

FIG. 11A shows an example of cord-reel-use information retained in the handset when the handset is replaced;

FIG. 11B shows an example of cord-reel-use information retained in the management apparatus when the handset is replaced;

DETAILED DESCRIPTION

Embodiments of the present disclosure will be described in detail while referencing the drawings. Note that, in some cases, unnecessarily detailed descriptions are foregone. For example, detailed descriptions of well-known matters and redundant descriptions of configurations and constituents that are substantially the same may be foregone.

Note that the following description and attached drawings are provided for the purpose of enabling a person skilled in the art to comprehend the present disclosure, and are not intended to limit the matters recited in the claims.

1. Embodiment 1

1-1. Configuration

Figure 1:
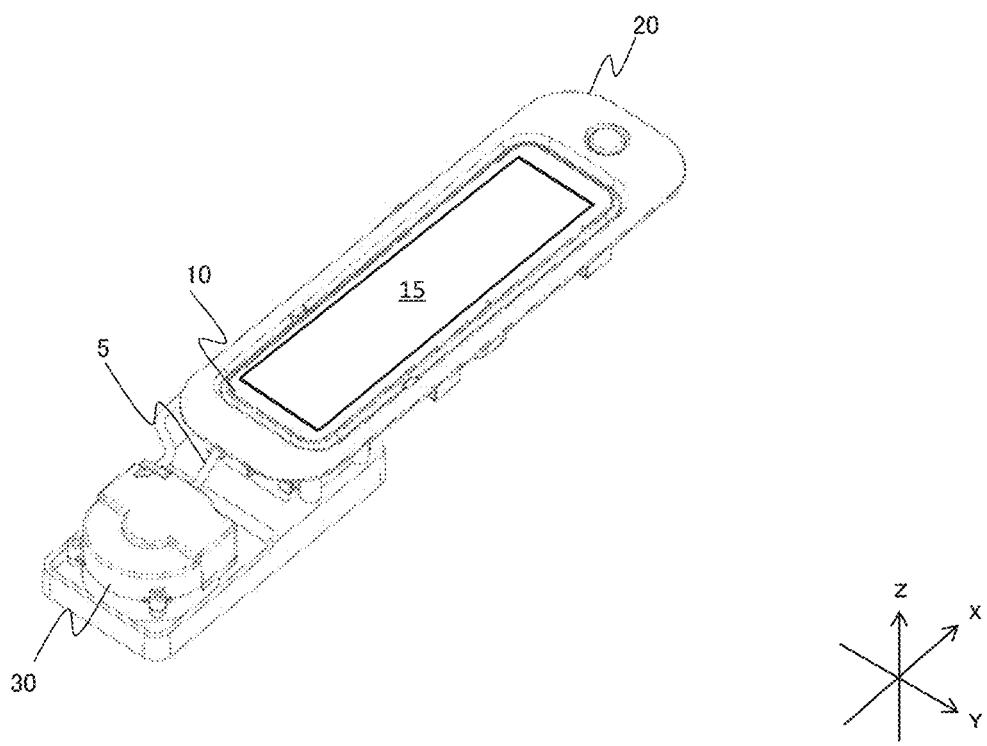
FIG. 1 is an external perspective view of a handset connected to a cord reel and set in a cradle.

FIG. 1 shows a handset 10 (one example of an electronic device), a cradle 20 set in the handset 10, and a cord reel 30 attached to the cradle 20. The handset 10 is installed, for example, in a seat of an aircraft and/or for use by crewmen.

The handset 10 is electrically connected via a cord 5 to another electronic device and/or a power source (neither are illustrated). The cord 5 is wound on the cord reel 30.

Figure 2:
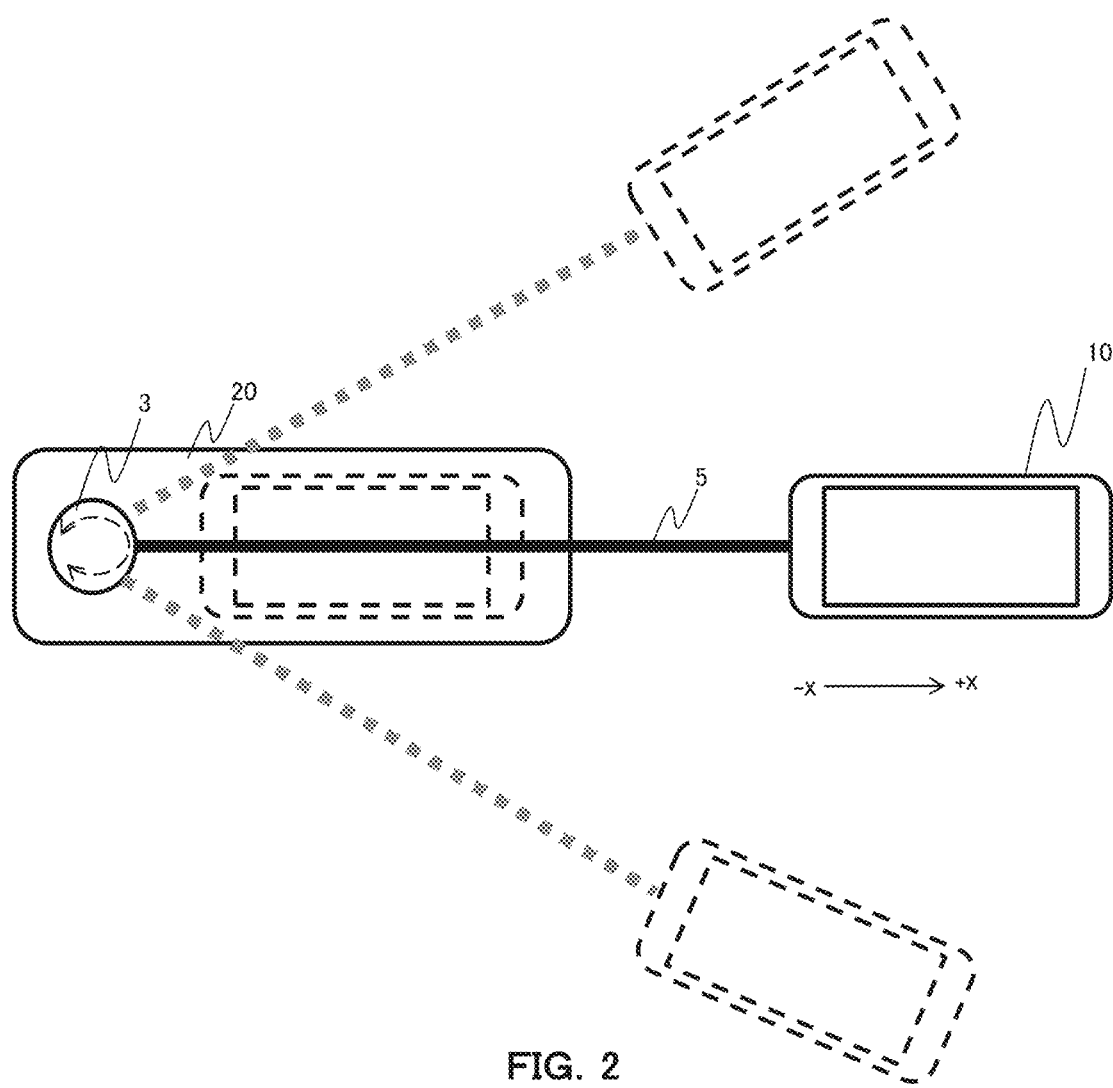
FIG. 2 is a diagram for describing how the handset is used.

When the handset 10 is used, a user (passenger, crewman, etc.) takes the handset 10 out of the cradle 20 and pulls the handset in a desired direction as shown in FIG. 2. The cord 5 is thereby unreeled from the cord reel 30, whereby the handset 10 can be moved to a desired position. When the handset 10 is returned to the cradle 20, the handset 10 is slightly pulled in an unreeling direction, the cord 5 is then unlocked by a control mechanism (not shown) of the cord reel 30 and reeled in on the cord reel 30. The handset 10 can thereby be set in the cradle 20.

As described above, the cord reel 30 connected to the handset 10 is repeatedly unreeled and reeled in with every use, and is therefore likely to deteriorate. The cord reel 30 often includes springs and other mechanisms, and is therefore also susceptible to physical damage with repeated use. Therefore, it is desirable that replacements and other acts of maintenance for the cord reel 30 be performed quickly. If an accumulated amount of use of the cord reel 30 can be figured out, the maintenance of the cord reel 30 is thought to be greatly improved because a time when the cord reel 30 is to deteriorate can be speculated.

The handset 10 and the cord reel 30 are used in a pair, but it is often the case in maintenance that only the cord reel 30 is replaced or only the handset 10 is replaced. However, when only the cord reel 30 is replaced, the amount of use of the before-replacement cord reel 30 must be canceled out. When only the handset 10 is replaced, the connected cord reel 30 has a cumulative amount of use, and this amount of use must therefore continue to be maintained.

With the system according to the present disclosure, the accurate amount of use of the cord reel 30 can be efficiently acquired and managed both when only the cord reel 30 is replaced and when only the handset 10 is replaced.

The configuration of a system 1 according to Embodiment 1 shall be described below.

1-1-1. Configuration of System 1

Figure 3:
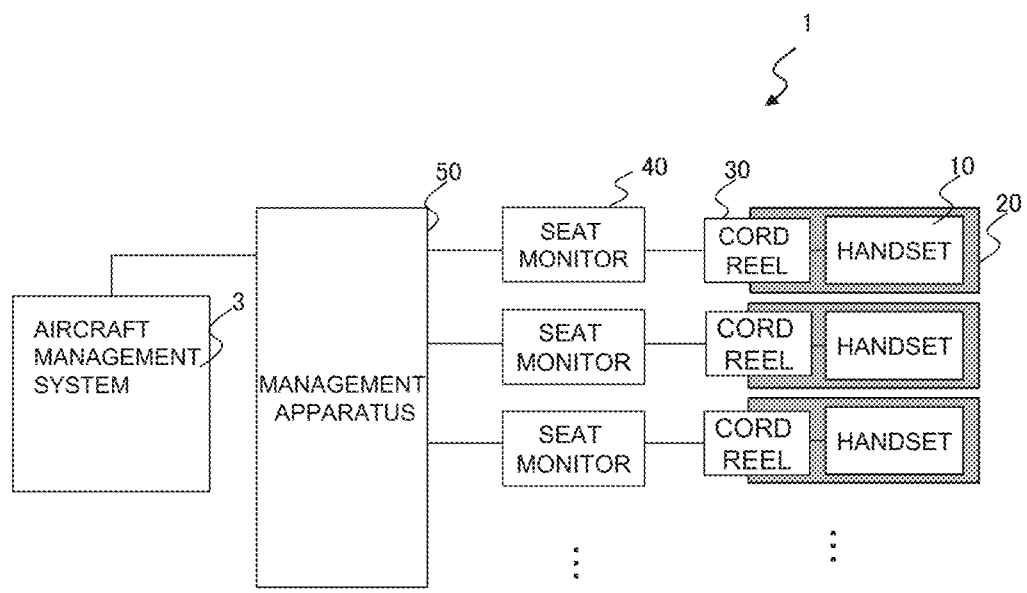
FIG. 3 is an overall configuration diagram of a system in Embodiment 1.

The system 1 according to Embodiment 1 includes handsets 10 placed in seats in an aircraft, and a management apparatus 50, as shown in FIG. 3. The handsets 10 are connected to the management apparatus 50 via seat monitors 40 placed in the seats.

The management apparatus 50 is also connected to an aircraft management system 3. The aircraft management system 3 acquires, updates, and stores flight information, etc., for the aircraft.

1-1-2. Configuration of Handset 10

Figure 4:
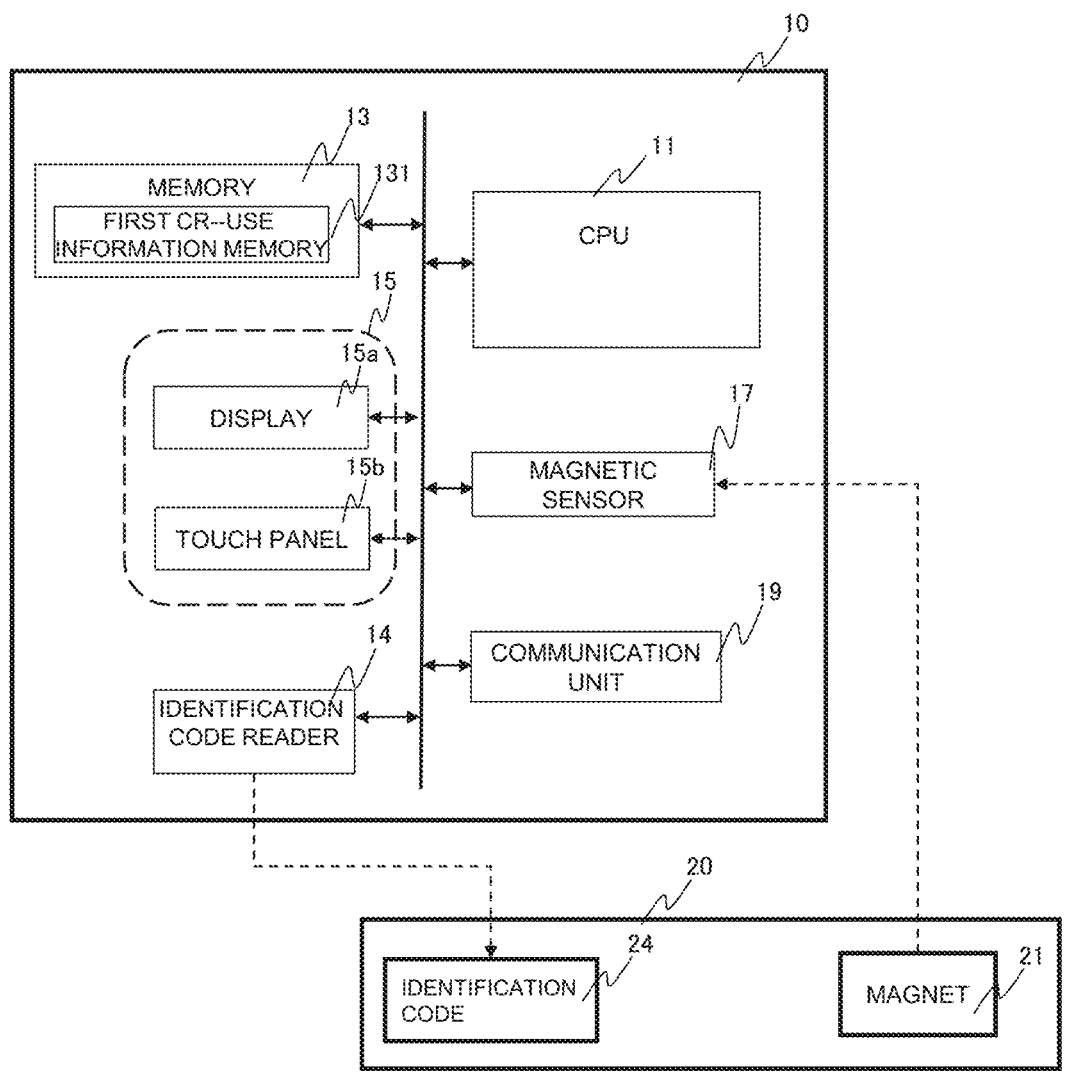
FIG. 4 is a configuration diagram of a handset according to Embodiment 1.

A handset 10 (one example of an electronic device) is used as a remote controller that transmits a signal to a seat monitor 40 and activates the seat monitor 40 in accordance with an operation of a passenger, or as another information input/output means. The handset 10 includes a CPU 11, a memory 13, an identification code reader 14, a display unit 15 including a display 15a and a touch panel 15b, a magnetic sensor 17, and a communication unit 19, as shown in FIG. 4.

The CPU 11 (one example of a controller or a first controller) includes circuitry configured to execute functions of the handset 10. The CPU 11 is a calculation processing apparatus and a control apparatus configured to execute various programs, and the CPU 11 controls all actions of the handset 10. In addition to launching and executing applications for animations and/or games, the CPU 11 executes pairing with the cord reel 30 and/or the generation and changing of cord-reel-use information, described hereinafter.

The memory 13 (one example of a memory or a first memory) includes read-only memory (ROM) that stores various parameters and various programs to be executed by the CPU 11, and random access memory (RAM) that stores calculation results, sensor values, and such other data. The memory 13 may also include a solid state drive (SSD), flash memory, or such other nonvolatile semiconductor storage device, a hard disk drive (HDD) or such other magnetic storage device, an optical storage device, a magneto-optical storage device, etc.

The memory 13 includes a first cord-reel (CR)-use information memory 131 that stores cord-reel-use information shown in FIG. 7A. The first cord-reel-use information memory 131 stores identification information of the handset 10, identification information of the cord reel 30 connected to the handset 10, and a cumulative number of uses (one example of the amount of use) of the cord reel 30. Information stored in the first cord-reel-use information memory 131 is generated by a pairing of the handset 10 and the cord reel 30, and is updated when the cord reel 30 is replaced and/or when the cord reel 30 is used, as is described hereinafter.

The identification code reader 14 reads an identification code 24 (e.g., a QR code, a two-dimensional bar code, an RFID tag, a physical pattern, etc.) attached to the cradle 20. The identification code 24 is information that identifies the cord reel 30 connected to the handset 10. The identification code reader 14 may be configured from a camera, a bar code reader, a light sensor, a contact sensor, a shape measurement means, etc., in accordance with the type of identification code 24. As another option, the identification code 24 may be configured from a prescribed pattern wiring, and the identification code reader 14 may be realized by measuring a voltage or current of the prescribed pattern wiring. The identification information of the cord reel 30 read by the identification code reader 14 is recognized by the CPU 11 and stored in the first cord-reel-use information memory 131.

The display unit 15 has the display 15a which is an LCD, an organic EL display, etc., and the touch panel 15b configured to receive input operations of the handset 10.

The magnetic sensor 17 (one example of a use detector) detects magnetism from a magnet 21 placed in the cradle 20. The magnetic sensor 17 ceases to detect a magnetic field of the magnet 21 when the handset 10 is taken out of the cradle 20. When the use of the handset 10 ends and the handset 10 is set in the cradle 20, the magnetic sensor 17 detects the magnetic field of the magnet 21. Upon receiving a detection signal from the magnetic sensor 17 after having not received detection signals, the CPU 11 determines that the handset 10 has been set in the cradle 20. In accordance with this determination, the CPU 11 determines that the cord reel 30 has been used and increase the cumulative number of uses of the cord reel 30.

The communication unit 19 includes, for example, a network card, a network adapter, and/or such other circuitry for communicating with other electronic devices. The communication unit 19 is configured to connect to the corresponding seat monitor 40 via the cord 5.

1-1-3. Configuration of Seat Monitor 40

A seat monitor 40 is installed in each seat, and the seat monitor 40 displays movies, music, and/or such other content, and other information (flight information, in-cabin announcement information, etc.) delivered from the management apparatus 50. The seat monitor 40 displays information, adjusts sound volume, or performs other actions in accordance with how the handset 10 is operated by the passenger.

Figure 5:
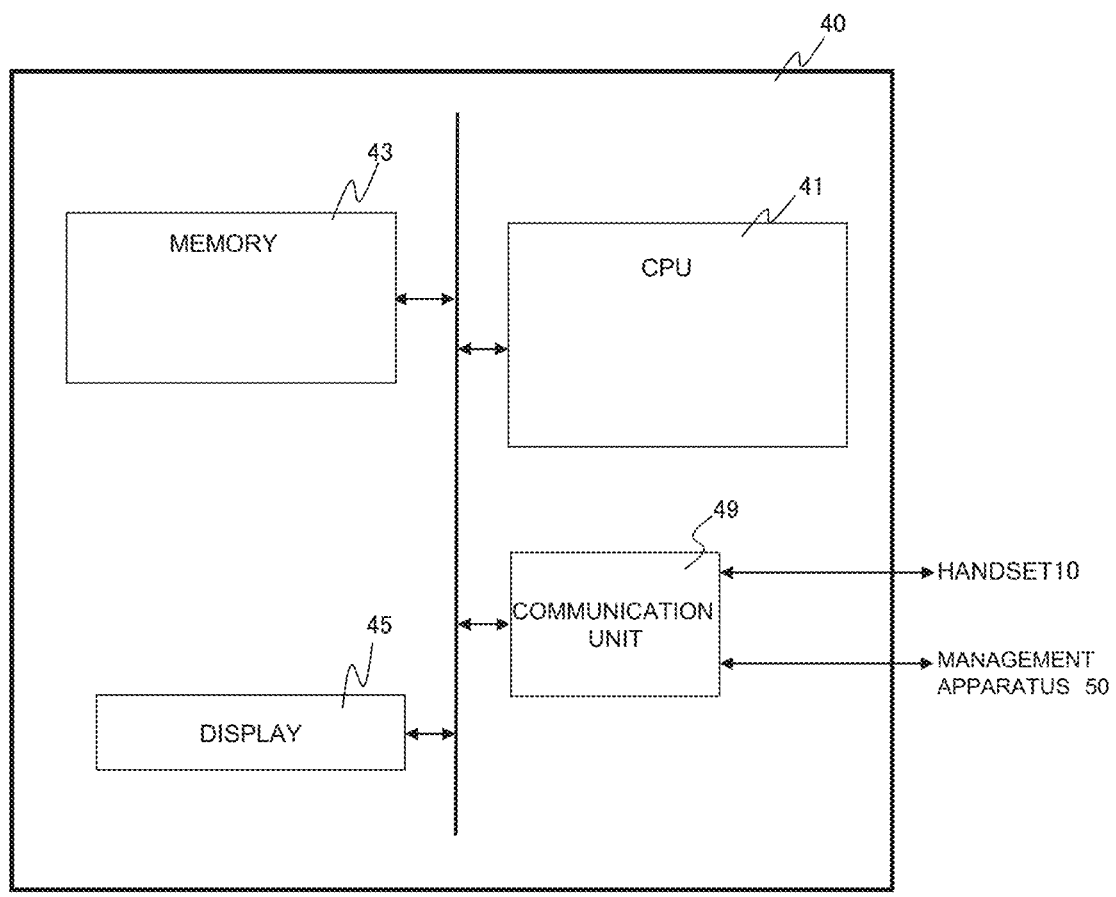
FIG. 5 is a configuration diagram of a seat monitor according to Embodiment 1.

The seat monitor 40 includes a CPU 41 for carrying out the functions of the seat monitor 40, a memory 43, a display 45, and a communication unit 49, as shown in FIG. 5.

The CPU 41 includes circuitry configured to execute the functions of the seat monitor 40. The CPU 41 executes prescribed programs.

The memory 43 includes ROM that stores various parameters and various programs to be executed by the CPU 41, and RAM that stores calculation results, sensor values, and such other data. The memory 43 may also include an SSD, flash memory, or such other nonvolatile semiconductor storage device, an HDD or such other magnetic storage device, an optical storage device, a magneto-optical storage device, etc.

The display 45 may be configured from an LCD, an organic EL display, etc. A touch panel that receives input operations may be placed in the display 45.

The communication unit 49 includes, for example, a network card, a network adapter, and/or such other circuitry for communicating with other computer devices. The communication unit 49 is configured to connect to the management apparatus 50 via a cable or another relay device, etc. The communication unit 49 is also configured to connect to the corresponding handset 10 via a cable (not shown) and the cord 5.

1-1-4. Configuration of Management Apparatus 50

The management apparatus 50 is configured to connect to a plurality of seat monitors 40 via wired cables or relay devices (not shown). The management apparatus 50 is, for example, a computer apparatus that functions as a server. The management apparatus 50 can connect to a plurality of seat monitors 40, and performs actions such as delivering content to the seat monitors 40 for the users sitting in front of the seat monitors 40, and outputting other information (flight information, in-cabin announcement information, etc.).

Figure 6:
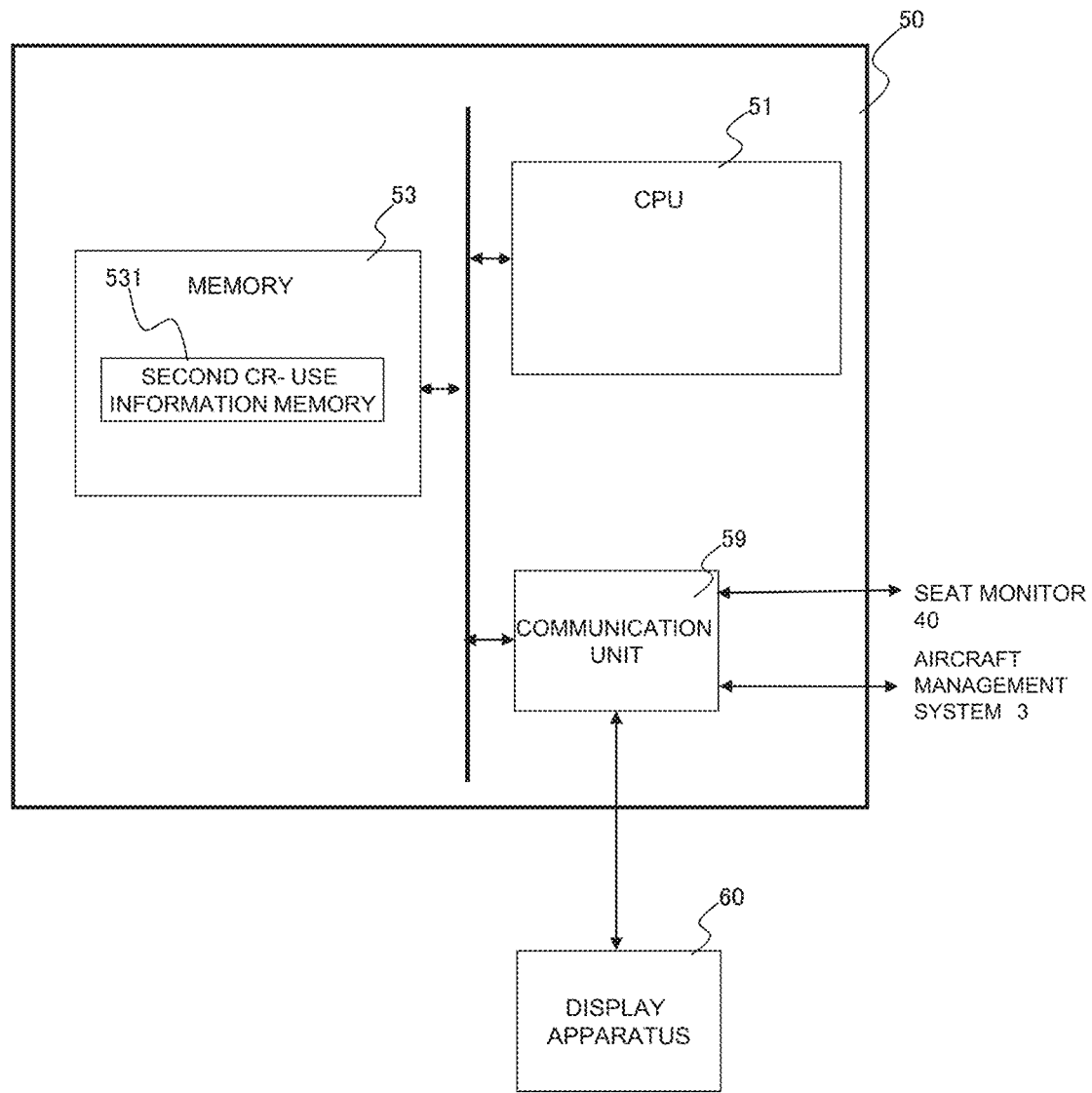
FIG. 6 is a configuration diagram of a management apparatus according to Embodiment 1.

The management apparatus 50 includes a CPU 51, a memory 53, and a communication unit 59, as shown in FIG. 6.

The CPU 51 (one example of a controller or a second controller) executes the functions of the management apparatus 50 by executing prescribed programs. The management apparatus 50 generates and/or changes use information of the cord reels 30 in accordance with notification signals from the handsets 10 of the seats, as is described hereinafter.

The memory 53 (one example of a memory or a second memory) includes ROM that stores various parameters and various programs to be executed by the CPU 51, and RAM that stores calculation results, sensor values, and such other data. The memory 53 may also include an SSD, flash memory, or such other nonvolatile semiconductor storage device, an HDD or such other magnetic storage device, an optical storage device, a magneto-optical storage device, etc.

The memory 53 includes a second cord-reel-use information memory 531 that stores cord-reel-use information shown in FIG. 7B. The second cord-reel-use information memory 531 correlates and stores identification information of the seats (one example of position information of the electronic devices), identification information of the handsets 10, and the cumulative number of uses of the cord reels 30. The identification information of the seats corresponds to the seat monitors 40. The management apparatus 50 stores, in correlation with the identification information of the seats, the cord-reel-use information (the identification information and numbers of cumulative uses of the handsets 10) transmitted from the handsets 10 connected to the seat monitors 40. The second cord-reel-use information memory 531 may include identification information of the cord reels. The information stored in the second cord-reel-use information memory 531, as is described hereinafter, is generated by pairings of the handsets 10 and the cord reels 30, and is updated when the cord reels 30 or handsets 10 are replaced and/or when the cord reels 30 are used.

The communication unit 59 (one example of an output unit) includes, for example, a network card, a network adapter, and/or such other circuitry configured to communicate with other computer devices. The communication unit 59 is configured to connect to the seat monitors 40, the aircraft management system 3 (FIG. 3), etc., via cables, a wireless communication device, etc.

The management apparatus 50 may output the cord-reel-use information of all of the seats to another display apparatus 60 (one example of an output unit), etc., connected via the communication unit 59. The cumulative number of uses of the cord reel 30 for each seat is displayed in the display apparatus 60 so as to be observable.

1-2. Operation

1-2-1. Acquisition of Number of Uses of Cord Reel 30

An action for determining cord-reel-use shall be described with reference to FIGS. 4 through 8. The CPU 11 of the handset 10 determines that the handset 10 is set in the cradle 20 (Yes in S101) when a detection signal from the magnetic sensor 17 is received. In accordance with this determination, the CPU 11 changes the cord-reel-use information stored in the first cord-reel-use information memory 131 (S102). The number of uses of the cord reel 30 is increased here. For example, in the case of a handset 10 of which the identification information shown in FIG. 7A is "1100025," 1 is added to the cumulative number of uses "000186" of the cord reel 30, resulting in "000187." The CPU 11 generates a count-up signal (one example of a second notification signal), and transmits this signal to the management apparatus 50 via the seat monitor 40 (S103). In the management apparatus 50, which has received the count-up signal from the seat monitor 40, the CPU 51 changes the cord-reel-use information stored in the second cord-reel-use information memory 531 (S104). Specifically, what is increased is the cumulative number of uses of the cord-reel-use information corresponding to the identification information (specified, for example, by an IP address of the seat monitor 40) of the corresponding seat. For example, among the items of cord-reel-use information of the plurality of handsets 10 shown in FIG. 7B, 1 is added to the cumulative number of uses "000186" of the cord reel 30 corresponding to the identification information "ST0002" of the seat corresponding to the identification information "1100025" of the handset 10, resulting in "000187."

The process of steps S101 to S104 described above is repeated, whereby the cumulative number of uses of the cord reel 30 correlated with the handset 10 is acquired and stored with each use.

In the determination of use of a cord reel 30 in step S101, the use may be counted when the handset is taken out of the cradle 20. In this case, the CPU 11 of the handset 10 increases the number of uses of the cord reel 30 in response to the cessation of a detection signal from the magnetic sensor 17 being received.

1-2-2. Pairing of Handset 10 and Cord Reel 30

The action of pairing a handset 10 and a cord reel 30 shall be described with reference to FIGS. 4 to 7, 9, and 10. The pairing action is executed when the handset 10 is first started up (including when the handset 10 and/or the cord reel 30 is replaced), when the power source is turned on, etc.

The identification code 24 on the cradle 20 is read by the identification code reader 14 of the handset 10 (S111). When identification information of the cord reel 30 is stored in the first cord-reel-use information memory 131 (Yes in S112), the CPU 11 then determines whether the read identification code and the identification information of the cord reel 30 in the first cord-reel-use information memory 131 match (S113). If the matching of the identification information of the cord reel 30 succeeds in this determination (Yes in S113), this means that a pairing of the handset 10 and the cord reel 30 connected to this handset 10 is already made, and therefore, the process is ended.

When the identification information of the cord reel 30 does not match (No in S113), this means that the cord reel 30 has been replaced. Consequently, the CPU 11 changes the cord-reel-use information stored in the first cord-reel-use information memory 131 (S114). Specifically, the cumulative number of uses of the cord reel 30 is reset to zero. For example, for the handset 10 of which the identification information is "1100025," the cord reel identification information "CR110055" (FIG. 7A) is changed to a newly read "CR120050" and the cumulative number of uses is set to "000000," as shown in FIG. 10A. The CPU 11 generates a reset signal (one example of a first notification signal) and transmits this signal to the management apparatus 50 via the seat monitor 40 (S115). In the management apparatus 50 which has received the reset signal transmitted from the seat monitor 40, the CPU 51 changes the cord-reel-use information stored in the second cord-reel-use information memory 531 (S116). More specifically, the cumulative number of uses of the cord-reel-use information corresponding to the identification information of the corresponding seat (e.g., specified by the IP address of the seat monitor 40) is reset to zero. For example, among the cord-reel-use information of a plurality of handsets 10, the cumulative number of uses of the cord reel 30 corresponding to the identification information "ST0002" of the seat, which corresponds to the identification information "1100025" of the handset 10, is set to "000000," as shown in FIG. 10B.

When it is determined that cord reel identification information has not been stored in the first cord-reel-use information memory 131 (No in S112), it means that the handset 10 is not paired with any cord reel 30, i.e., the handset 10 has been replaced. Consequently, the CPU 11 uses the identification code read by the identification code reader 14 to generate cord-reel-use information (S117). For example, when the handset is "1101189," cord-reel-use information is generated anew in which the read cord reel identification information is "CR104608" and the cumulative number of uses is "000000," as shown in FIG. 11A, and this new cord-reel-use information is stored in the first cord-reel-use information memory 131. The CPU 11 generates an update signal and transmits this signal to the management apparatus 50 via the seat monitor 40 (S118). In the management apparatus 50 which has received the update signal from the seat monitor 40, the CPU 51 changes the second cord-reel-use information memory 531 (S119). More specifically, the cumulative number of uses of the cord-reel-use information corresponding to the identification information of the seat specified by the update signal is totaled into what was counted in the handset 10 before the replacement. For example, when the seat for which the handset 10 was replaced is "ST004," among the cord-reel-use information of a plurality of handsets 10 shown in FIG. 11B, the identification information of the handset corresponding to the seat identification information "ST004" is changed to "1101189" (FIG. 11B), and the already-stored cumulative number of uses is left unchanged at "000365."

Through the execution of the process of steps S111 to S119 described above, the cumulative number of uses of the cord reel 30 correlated with the handset 10 is accurately acquired, maintained, and stored, even when the cord reel 30 or the handset 10 has been replaced.

1-3. Modifications

In the example described above, the use of the cord reel 30 is detected by using the magnetic sensor 17 to count the number of uses of the cord reel 30, but this example is not provided by way of limitation. It is sufficient to use a means that detects some sort of physical change relating to at least one of the handset 10, the cradle 20, and the cord reel 30; for example, a use detection means such as the following may be used.

Figure 8:
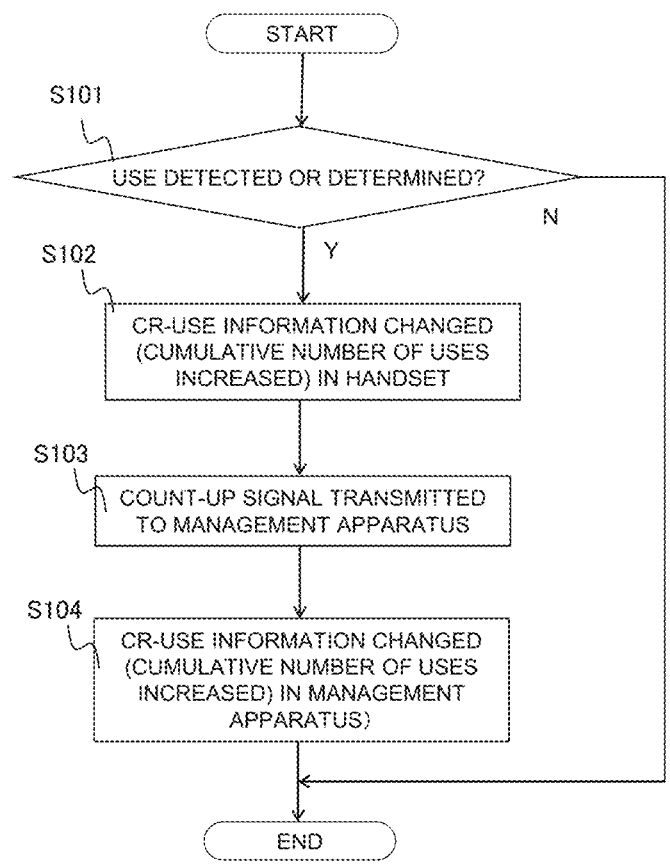
FIG. 8 is a flowchart of the operation of the system according to Embodiment 1.
Figure 12:
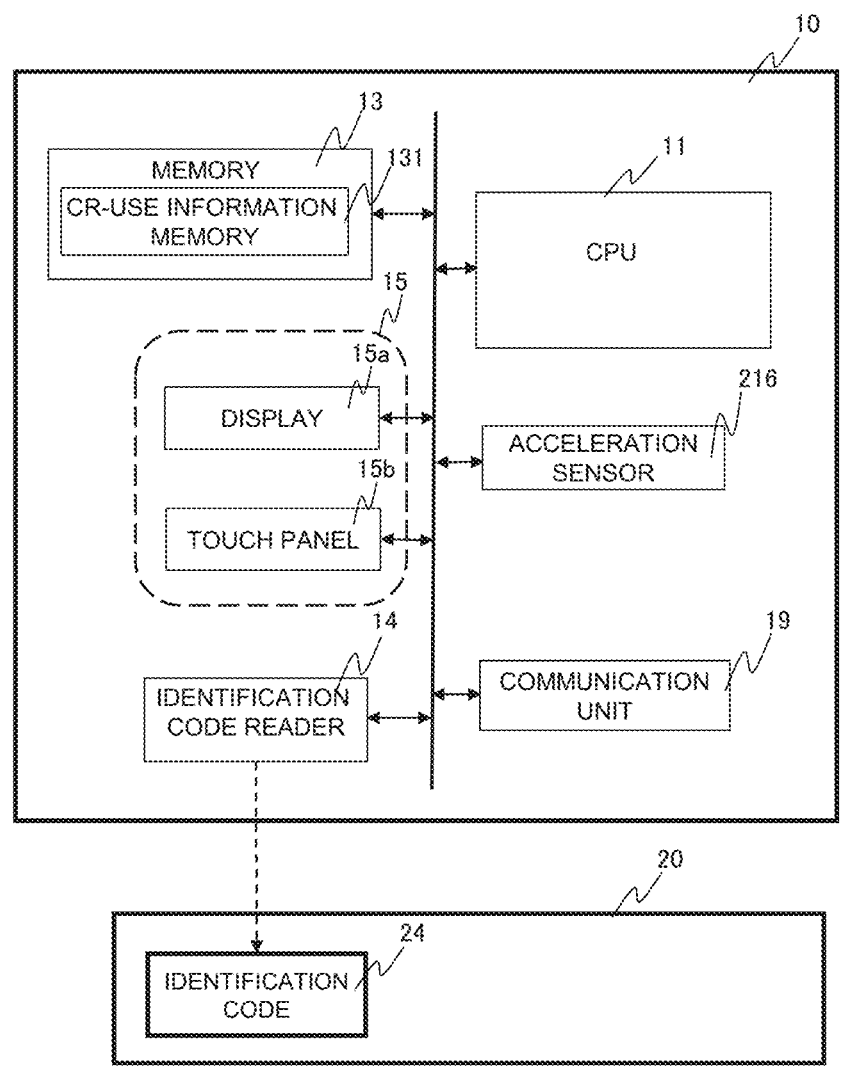
FIG. 12 is a configuration diagram of a handset according to a modification.

The handset 10 may use an acceleration sensor 216 to count the number of uses of the cord reel 30, as shown in FIG. 12. The acceleration sensor 216 detects movement of the handset 10 (including movement direction, acceleration, and movement distance). The acceleration sensor 216 is, for example, a three-axis (three-dimensional) type that detects acceleration in an X-axis direction, a Y-axis direction, and a Z-axis direction, which are shown in FIG. 1. This example is not provided by way of limitation as to the type of the acceleration sensor 216. The acceleration sensor 216 may be, for example, a piezoresistive, capacitive, or other type. In response to detection of movement of the handset 10 in a +X direction and/or a −X direction shown in FIG. 2, the CPU 11 of the handset 10 determines that the cord reel 30 has been used and the operation of steps S101 to S104 in FIG. 8 is executed.

Figure 13:
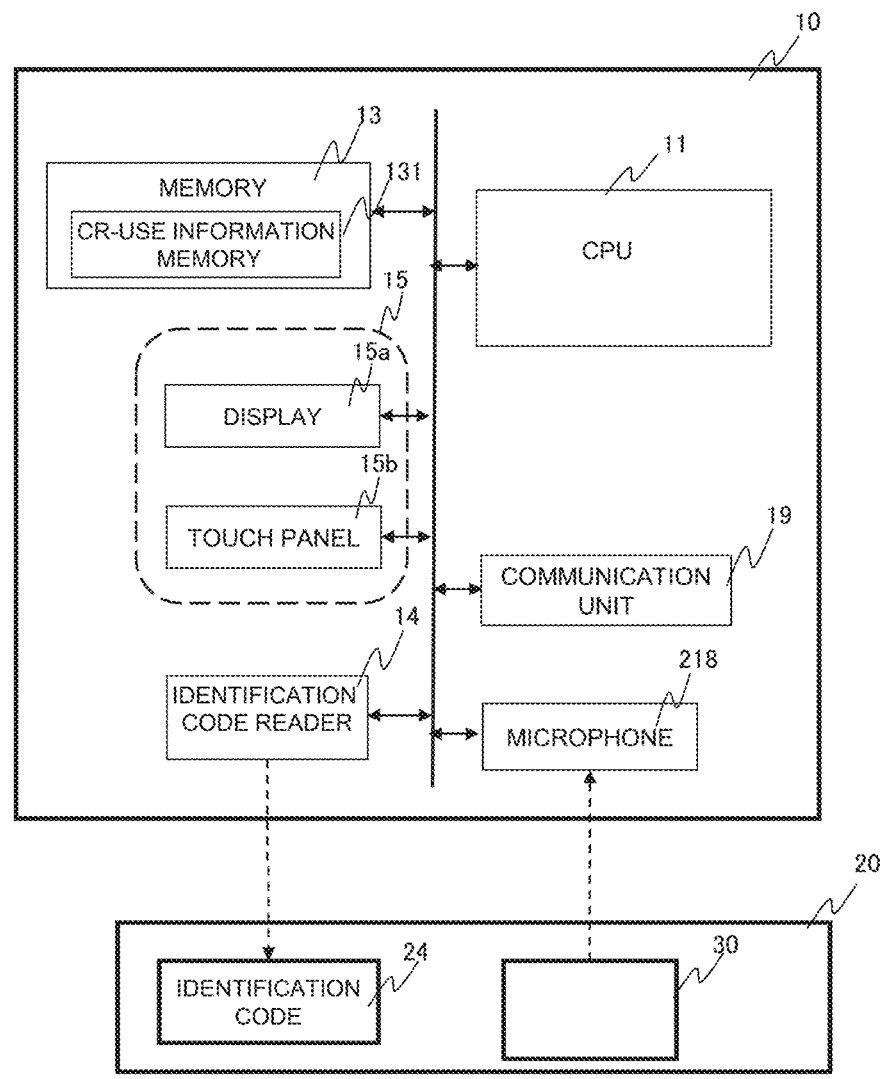
FIG. 13 is a configuration diagram of a handset according to another modification.

The handset 10 may use a microphone 218 to count the number of uses of the cord reel 30, as shown in FIG. 13. The microphone 218 acquires sounds in a periphery of the handset 10 and converts the sounds to electric signals. The CPU 11 detects a prescribed sound from the acquired sounds. The prescribed sound is a reeling sound produced when the cord 5 is unreeled from the cord reel 30 or reeled in. The reeling sound is, for example, a clicking sound produced by rotation of the cord reel 30. The CPU 11 may, for example, preemptively store a waveform pattern equivalent to the reeling sound in the memory 13, and detect the reeling sound by comparing the waveform pattern with the sounds acquired from the microphone 218. The CPU 11 determines use of the cord reel 30 in response to the detection of the reeling sound, and the operation of step S101 to S104 in FIG. 8 is executed.

The CPU 11 may detect a reeling sound on the basis of vibration detected by the acceleration sensor 216. In this case, the CPU 11 may, for example, preemptively store a vibration pattern equivalent to the reeling sound in the memory 13, and detect the reeling sound by comparing the vibration pattern with vibrations acquired by the acceleration sensor 216.

As other options, the following examples can be applied as a means for detecting use of the cord reel 30.

A camera (not shown) provided to the handset 10 is used to photograph the periphery of the handset 10, the fact that the handset 10 is set in the cradle 20 is detected from the acquired image, and a use is determined in response to this detection.

An infrared sensor or ultrasonic sensor (neither are shown) is used to measure a distance between the handset 10 and the cradle 20, the fact that the handset 10 is set in the cradle 20 is detected based on the measurement, and a use is determined in response to this detection.

A piezoelectric sensor (not shown) is used to detect that the handset 10 has been set in the cradle 20, and a use is determined in response to this detection. For example, piezoelectric sensors are attached to a contact surface of the handset 10 with the cradle 20 when set in the cradle 20, and a use is determined when pressure is exerted on all the locations where the sensors are attached.

A temperature sensor (not shown) is provided to a contact part of the handset 10 with the cradle 20 when set in the cradle 20, and a use is determined according to a difference in temperature between the time when the handset 10 is set in the cradle 20 and the time when the handset 10 is not set in the cradle 20.

A touch sensor (resistance film, capacitive), a vibration sensor, a contact sensor, a photoelectric sensor, a proximity sensor, a fluid sensor, a color sensor, or a laser sensor (none of which are shown) is used to detect that the handset 10 has been set in the cradle 20, and a use is determined in response to this detection.

1-4. Characteristics, Etc.

In the system 1 according to Embodiment 1, a use of a cord reel 30 is determined, and the amount of use of the cord reel 30 is changed and stored in response to the handset 10 being replaced with another handset 10 or in response to the cord reel 30 being replaced with another cord reel 30.

Therefore, when the cord reel 30 or the handset 10 has been replaced, the cumulative number of uses of the cord reel 30 correlated with the handset 10 is accurately acquired, maintained, and stored. Due to this configuration, it is easy to surmise the replacement period or the extent of deterioration of the cord reel 30, and maintenance work can be efficiently performed.

2. Other Embodiments

While only selected exemplary embodiments have been chosen to illustrate the present disclosure, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element, can be performed by two, and vice versa. The structures and functions of one embodiment can be adopted in another embodiment. It is not necessary for all advantages to be present in a particular embodiment at the same time, Every feature which is unique from the prior art, alone or in combination with other features, also should be considered a separate description of further inventions by the applicant, including the structural and/or functional concepts embodied by such feature(s), Thus, the foregoing descriptions of the exemplary embodiments according to the present disclosure are provided for illustration only and not for the purpose of limiting the invention as defined by the appended claims and their equivalents.

Figure 14:
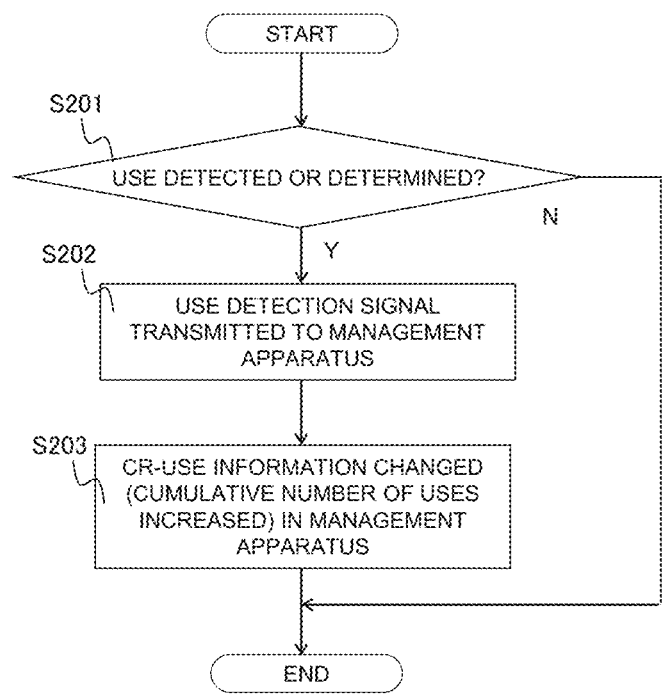
FIG. 14 is a flowchart showing an operation of a system according to another embodiment.

(1) In Embodiment 1, the number of uses of the cord reel 30 was retained in the handset 10, but this example is not provided by way of limitation. With each determination of use (S201), the handset 10 may transmit a use detection signal to the management apparatus 50 (S202), and the cumulative number of uses may be retained and stored in the management apparatus 50 alone (S203), as shown in FIG. 14. In this case, the information stored in the first cord-reel-use information memory 131 (FIG. 4) of the handset 10 shown in FIG. 7A includes only handset identification information and cord reel identification information, and does not include the cumulative number of uses.

Figure 9:
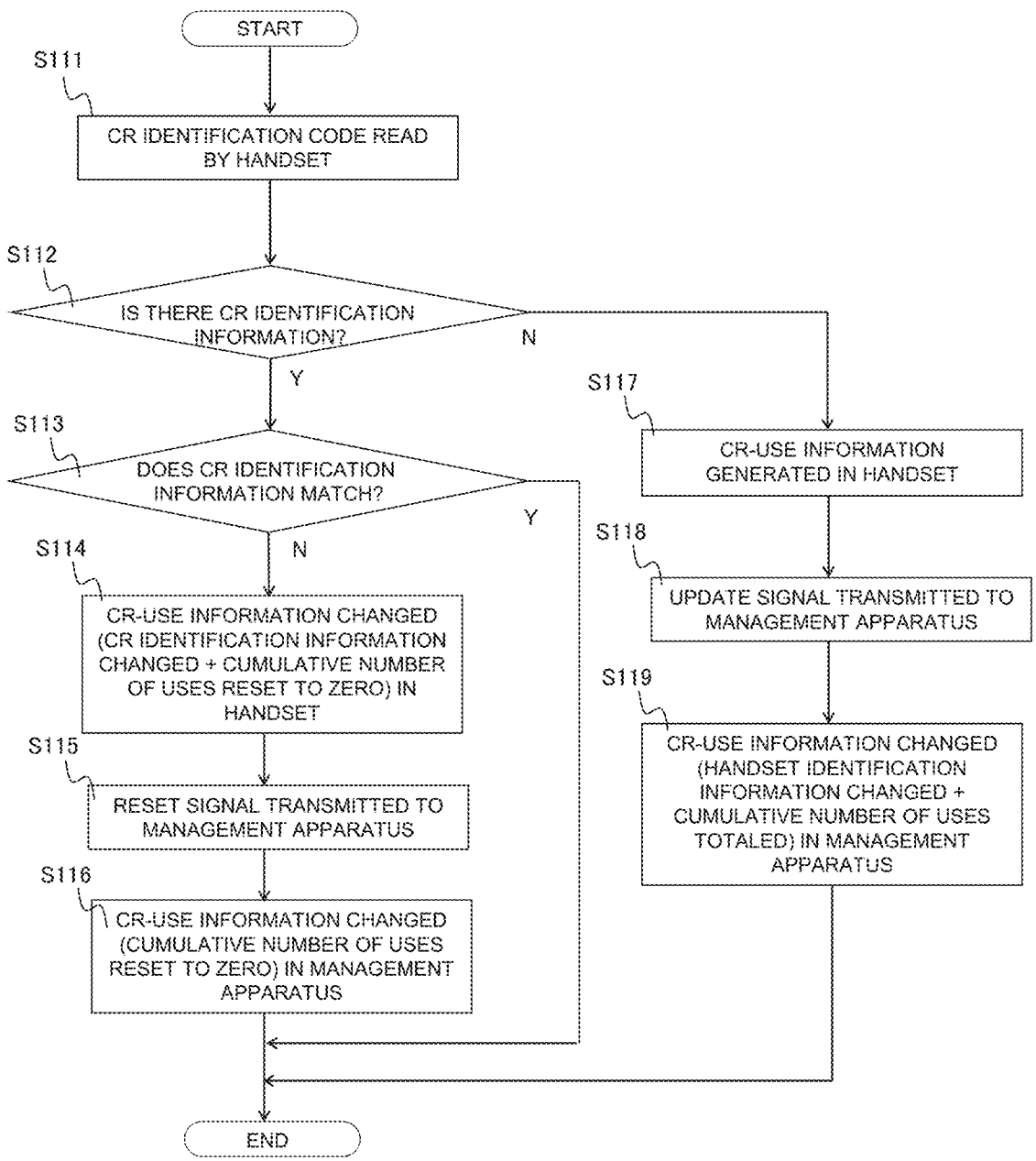
FIG. 9 is a flowchart of the operation of the system according to Embodiment 1.

(2) In Embodiment 1, the handset 10 sends out a reset signal according to the pairing with a cord reel 30 as shown in FIG. 9, but this example is not provided by way of limitation. For example, during maintenance, when a maintenance worker replaces the cord reel 30, a reset signal may be sent out by the handset 10 being operated by the maintenance worker.

(3) The handsets 10 of the seats and the management apparatus 50 may be enabled to communicate with each other without seat monitors. In this case, the correlations of the identification information of the seats and the identification information of the handsets 10 may be registered in the management apparatus 50 in advance.

(4) The cord-reel-use information retained in the management apparatus 50 shown in FIG. 7B need not include identification information of handsets 10. In this case, the management apparatus 50 retains only the identification information of the seats that can be specified by the seat monitors 40 and the cumulative number of uses of the corresponding cord reels 30.

(5) The examples shown in FIG. 1 are not provided by way of limitation as to the outward appearance and/or shape of the handset 10 and the cradle 20 according to Embodiment 1. For example, the handset 10 may be a vertically mounted type, which is accommodated in the cradle 20 in a vertical direction.

(6) In Embodiment 1, the controller of the handset 10 and/or the management apparatus 50 may include, instead of the CPU 11 or 51, a processor configured from a dedicated electronic circuit designed so as to carry out a prescribed function. Additionally, the processor may be configured from one or a plurality of processors. In the present specification, the term "system" can mean a single constituent element or an assembly of a plurality of constituent elements (apparatuses, modules (components), etc.), and all of the constituent elements may or may not be placed within the same casing. Whether two or more apparatuses are accommodated in separate casings and connected via a network or one apparatus includes a plurality of modules accommodated within one casing, both are cases that would be referred to as a system.

(7) The flowcharts described above are not provided by way of limitation as to the flowcharts shown in FIGS. 8, 9, and 14. As to the sequence of the processes, some of the processes may be substituted, or some of the processes may be executed in parallel.

(8) In addition to an aircraft, the system 1 of the present disclosure may also be installed in rolling stock, buses, ships, or other moving objects or passenger moving objects, or the system may be installed in another facility.

General Interpretation in of Terms

In understanding the scope of the present disclosure, the term "configured" as used herein to describe a component, section, or a part of a device includes hardware and/or software that is constructed and/or programmed to carry out the desired function.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present disclosure. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A system including an electronic device connected to a cord that can be unreeled and reeled in by a cord reel, and a management apparatus configured to communicate with the electronic device, the system comprising:
   a cord-reel-use detector configured to detect use of the cord reel;
   at least one memory disposed in at least one of the electronic device and the management apparatus, the at least one memory configured to store an amount of the use of the cord reel; and
   at least one controller, disposed in at least one of the electronic device and the management apparatus, and configured to determine the use of the cord reel based on detection made by the cord-reel-use detector, change the amount of the use of the cord reel in response to the electronic device being replaced with another electronic device or in response to the cord reel being replaced with another cord reel, and reduce the amount of the use of the cord reel when the cord reel has been replaced with another cord reel.

2. The system according to claim 1, wherein
   the at least one memory includes a first memory disposed in the electronic device and a second memory disposed in the management apparatus,
   the first memory is configured to correlate and store at least identification information of the electronic device and identification information of the cord reel, and
   the second memory is configured to correlate and store at least identification information of the electronic device or positional information of the electronic device and the amount of the use of the cord reel.

3. The system according to claim 2, wherein:
   the electronic device further includes an identification information reader configured to read identification information of the cord reel;
   the at least one controller includes a first controller disposed in the electronic device and a second controller disposed in the management apparatus;
   the first controller is configured to
   store the identification information of the cord reel read by the identification information reader in the first memory, and
   transmit a first notification signal to the management apparatus when the identification information of the cord reel read by the identification information reader differs from the identification information of the cord reel stored in the first memory; and
   the second controller is configured to reduce the amount of the use of the cord reel corresponding to the electronic device in response to reception of the first notification signal.

4. A system including an electronic device connected to a cord that can be unreeled and reeled in by a cord reel, and a management apparatus configured to communicate with the electronic device, the system comprising:
   a cord-reel-use detector configured to detect use of the cord reel;
   at least one memory disposed in the management apparatus, the at least one memory configured to correlate and to store an identification number of the electronic device, an amount of the use of the cord reel and positional information of the electronic device; and
   at least one controller, disposed in at least one of the electronic device and the management apparatus, and configured to determine the use of the cord reel based on detection made by the cord-reel-use detector, and change the amount of the use of the cord reel in response to the electronic device being replaced with another electronic device or in response to the cord reel being replaced with another cord reel.

5. A system including an electronic device connected to a cord that can be unreeled and reeled in by a cord reel, and a management apparatus configured to communicate with the electronic device, the system comprising:
   a cord-reel-use detector configured to detect use of the cord reel;
   at least one memory disposed in at least one of the electronic device and the management apparatus, the at least one memory configured to store an amount of the use of the cord reel; and
   at least one controller, disposed in at least one of the electronic device and the management apparatus, and configured to determine the use of the cord reel based on detection made by the cord-reel-use detector, change the amount of the use of the cord reel in response to the electronic device being replaced with another electronic device or in response to the cord reel being replaced with another cord reel, and, when the electronic device has been replaced with another electronic device, add up amounts of the use of the cord reel before and after the replacement.

6. The system according to claim 5, wherein the controller is configured to reduce the amount of the use of the cord reel when the cord reel has been replaced with another cord reel.

7. The system according to claim 5, wherein the controller is configured to reset the amount of the use of the cord reel to zero when the cord reel has been replaced with another cord reel.

8. The system according to claim 5, wherein
   the at least one memory includes a first memory disposed in the electronic device and a second memory disposed in the management apparatus,
   the first memory is configured to correlate and store at least identification information of the electronic device and identification information of the cord reel, and
   the second memory is configured to correlate and store at least identification information of the electronic device or positional information of the electronic device and the amount of the use of the cord reel.

9. The system according to claim 8, wherein:
   the electronic device further includes an identification information reader configured to read identification information of the cord reel;

the at least one controller includes a first controller disposed in the electronic device and a second controller disposed in the management apparatus;

the first controller is configured to store the identification information of the cord reel read by the identification information reader in the first memory, and transmit a first notification signal to the management apparatus when the identification information of the cord reel read by the identification information reader differs from the identification information of the cord reel stored in the first memory; and the second controller is configured to reduce the amount of the use of the cord reel corresponding to the electronic device in response to reception of the first notification signal.

10. The system according to claim 5, wherein the at least one controller includes a first controller disposed in the electronic device and a second controller disposed in the management apparatus, the first controller is configured to transmit a second notification signal to the management apparatus in response to each detection made by the cord-reel-use detector, and the second controller is configured to increase the amount of the use of the cord reel in response to each reception of the second notification signal.

11. The system according to claim 5, wherein the management apparatus is configured to connect to a plurality of electronic devices.

12. The system according to claim 5, wherein the cord-reel-use detector includes a sensor configured to detect the electronic device being set in or taken out of a cradle, and the controller is configured to determine the use of the cord reel based on output of the sensor.

13. The system according to claim 5, wherein the cord-reel-use detector includes an acceleration sensor configured to detect movement of the electronic device or a microphone configured to pick up sounds produced when the cord reel rotates, and the controller is configured to determine the use of the cord reel based on output of the acceleration sensor or the microphone.

14. The system according to claim 5, comprising an output unit configured to output positional information of a plurality of the electronic devices and information indicating respective amounts of use of a plurality of the cord reels connected to the plurality of the electronic devices.

* * * * *